United States Patent
Chen et al.

(10) Patent No.: US 7,069,439 B1
(45) Date of Patent: Jun. 27, 2006

(54) COMPUTING APPARATUS AND METHODS USING SECURE AUTHENTICATION ARRANGEMENTS

(75) Inventors: Liqun Chen, Bradley Stoke Bristol (GB); Hoi-Kwong Lo, NY, NY (US); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/936,132

(22) PCT Filed: Mar. 3, 2000

(86) PCT No.: PCT/GB00/00751

§ 371 (c)(1),
(2), (4) Date: Sep. 4, 2001

(87) PCT Pub. No.: WO00/54125

PCT Pub. Date: Sep. 14, 2000

(30) Foreign Application Priority Data

Mar. 5, 1999 (GB) .................................. 9905056.9

(51) Int. Cl.
*H04L 9/00* (2006.01)
(52) U.S. Cl. .................. 713/172; 713/159; 713/185; 726/20; 726/26; 380/251; 380/255
(58) Field of Classification Search ................ 713/165, 713/172, 185, 189; 380/210, 251
See application file for complete search history.

(56) References Cited

U.S. PATENT DOCUMENTS

| 4,562,306 A | 12/1985 | Chou et al. |
| 5,327,497 A | 7/1994 | Mooney et al. |
| 5,361,359 A | 11/1994 | Tajalli et al. |
| 5,379,344 A | 1/1995 | Larsson et al. ................ 380/23 |

(Continued)

FOREIGN PATENT DOCUMENTS

EP       0 379 333 A1     7/1990

(Continued)

OTHER PUBLICATIONS

U.S. Appl. No. 09/936,131, filed Sep. 4, 2001, Balacheff et al.

(Continued)

*Primary Examiner*—Gilberto Barrón, Jr.
*Assistant Examiner*—Abdulhakim Nobahar

(57) ABSTRACT

Computing apparatus comprises a memory means storing the instructions of a secure process and an authentication process; a processing means arranged to control the operation of the computing apparatus including by executing the secure process and the authentication process; a user interface means arranged to receive user input and return to the user input; and an interface means for receiving a removable primary token and communication with the token. The token comprises a body supporting a token interface for communicating with the interface means, a token processor; and a token memory adapted to store token data including information for identifying the token and auxiliary token information identifying one or more authorized auxiliary tokens. The processing means is arranged to receive the identity information and the auxiliary token information from the primary token, to authenticate the toke using the authentication process and, if the token is successfully authenticated, permit a user to interact with the secure process via the user interface means. The processing means is arranged to repeatedly authenticate the primary toke and cause the computing platform to suspend interaction between the secure process and the user if authentication is not possible as a result of the removal of the primary token unless the primary token is replaced by an authorized auxiliary token.

27 Claims, 10 Drawing Sheets

U.S. PATENT DOCUMENTS

| | | | | |
|---|---|---|---|---|
| 5,442,704 | A | * | 8/1995 | Holtey .................... 713/189 |
| 5,544,246 | A | | 8/1996 | Mandelbaum et al. ........ 380/23 |
| 5,666,412 | A | | 9/1997 | Handelman et al. ........... 380/4 |
| 5,721,781 | A | | 2/1998 | Deo et al. .................... 380/25 |
| 5,761,309 | A | | 6/1998 | Ohashi et al. ................ 380/25 |
| 5,768,382 | A | * | 6/1998 | Schneier et al. ............ 380/251 |
| 5,778,072 | A | * | 7/1998 | Samar ........................ 713/172 |
| 5,822,431 | A | | 10/1998 | Sprunk ........................ 380/25 |
| 5,864,624 | A | | 1/1999 | Lukas et al. |
| 5,872,849 | A | | 2/1999 | Sudia .......................... 380/49 |
| 5,917,168 | A | * | 6/1999 | Nakamura et al. .......... 235/379 |
| 5,923,759 | A | * | 7/1999 | Lee ............................. 713/159 |
| 6,018,717 | A | | 1/2000 | Lee et al. ..................... 705/13 |
| 6,173,400 | B1 | * | 1/2001 | Perlman et al. ............. 713/172 |
| 6,189,098 | B1 | | 2/2001 | Kaliski, Jr. ................. 713/168 |
| 6,212,635 | B1 | * | 4/2001 | Reardon ..................... 713/165 |
| 6,230,266 | B1 | | 5/2001 | Perlman et al. ............. 713/158 |
| 6,233,687 | B1 | | 5/2001 | White ......................... 713/201 |
| 6,246,771 | B1 | | 6/2001 | Stanton et al. .............. 380/286 |
| 6,298,441 | B1 | * | 10/2001 | Handelman et al. ........ 713/185 |
| 6,311,272 | B1 | | 10/2001 | Gressel ....................... 713/186 |
| 6,330,670 | B1 | | 12/2001 | England et al. ................ 713/2 |
| 6,381,696 | B1 | | 4/2002 | Doyle ......................... 713/156 |
| 6,405,369 | B1 | * | 6/2002 | Tsuria ........................ 380/210 |
| 6,490,680 | B1 | | 12/2002 | Scheidt et al. .............. 713/166 |
| 6,738,901 | B1 | | 5/2004 | Boyles et al. ............... 713/159 |

FOREIGN PATENT DOCUMENTS

| | | |
|---|---|---|
| EP | 0 421 409 A2 | 4/1991 |
| EP | 0 552 392 B1 | 7/1993 |
| EP | 0 848 315 A2 | 6/1998 |
| EP | 0 992 958 A2 | 4/2000 |
| EP | 1 081 891 A2 | 3/2001 |
| GB | 2 317 038 | 3/1998 |
| GB | 2 317 983 | 4/1998 |
| GB | 2 320 597 | 6/1998 |
| WO | 93/24906 | 12/1993 |
| WO | 95/24696 | 9/1995 |
| WO | 97/29416 | 8/1997 |
| WO | 98/55912 | 12/1998 |

OTHER PUBLICATIONS

U.S. Appl. No. 09/946,323, filed Sep. 4, 2001, Chen et al.

Yee, B., "Using Secure Coprocessors," Doctoral thesis—Carnegie Mellon University, pp. 1-94 (May 1994).

Anderson, R. and Markus Kuhn, "Tamper Resistance—a Cautionary Note," 16 pages, located at Internet address <www.c1.cam.ac.uk/-mgk25/tamper.html> (1996).

Anderson, R. and Markus Kuhn, "Tamper Resistance—a Cautionary Note," *Proceedings of the Second USENIX Workshop on Electronic Commerce*, Oakland CA, pp. 1-11 (Nov. 1996).

Balacheff, B., et al., "Smartcards—From Security Tokens to Intelligent Adjuncts," *CARDIS 1998 Proceedings*, pp. 71-84 (Sep. 1998).

Chaum, D., "Security Without Identification: Transaction Systems to Make Big Brother Obselete," *Communications of the ACM*, vol. 28, No. 10, pp. 1030-1044 (Oct. 1985).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-D (1999).

Thomasson, J.-P. and L. Baldi, "Smartcards: Portable Security," *2nd Annual IEEE International Conference on Innovation Systems in Silicon*, pp. 259-265 (Oct. 1997).

The Trusted Computing Platform Alliance, "Building a Foundation of Trust in the PC,", 9 pages, located at Internet address <www.trustedpc.org/home/home.html> (Jan. 2000).

Trusted Computing Platform Alliance, Main Specification Version 1.0, 284 pages (Jan. 25, 2001).

Woo, T.Y.C. and S.S. Lam, "Authentication for Distributed Systems," Computer, vol. 25, No. 1, pp. 39-52 (Jan. 1992).

Abstract of Netherlands Patent NL 9101506, published Apr. 1, 1993.

Ferreira, R., "The Practical Application of State of the Art Security in Real Environments," *Proceedings of the International Conference on Cryptology, Auscrypt*, pp. 334-355 (Jan. 1990).

Verschuren, T., "Smart access: strong authentication on the Web," *Computer Networks and ISDN Systems*, vol. 30, No. 16-18, pp. 1511-1519 (Sep. 30, 1998).

Rankl, W., et al., *Handbuch der Chipkarten*, Carl Hanser Verlag Müchen Wien, pp. 346-349 (1996).

* cited by examiner

COMPUTING APPARATUS AND METHODS USING SECURE AUTHENTICATION ARRANGEMENTS

CROSS REFERENCE TO RELATED APPLICATIONS

The subject matter of the present application may also be related to the following U.S. patent applications: "Smartcard User Interface for Trusted Computing Platform," Ser. No. 09/936,131, filed Sep. 4, 2001; and "Method and Apparatus for Using a Secret in a Distributed Computing System," Ser. No. 09/946,323, filed Sep. 4, 2001.

TECHNICAL FIELD

This invention relates to computing apparatus and particularly, but not exclusively, to computing apparatus and methods of operating computing apparatus in a secure environment using security tokens.

BACKGROUND ART

Security tokens, for example smart cards or cryptographic co-processors, have recently been proposed for various security functions including accessing computer platforms (or 'host platforms') and electronic commerce. For instance, a smart card storing confidential information accessible only to a related user can be used by the user to log on to a computer, to sign a document, or to provide credentials needed for electronic commerce.

In some cases, it is expected that more than one security token for plural different applications may need to be used in a single communication session, which starts as the user logs on to a host platform and finishes as the user logs off.

One possible model works as follows. A user has a number of tokens and, in each session, they use one of these tokens (for example, a logon token) for authentication to a host platform in the logon process only. During the same session, the user separately uses other tokens (for example, auxiliary tokens) for other security functions, such as electronic payment or cryptography.

DISCLOSURE OF THE INVENTION

In arriving at the present invention, the present inventors have appreciated the following three potential problems with this model:

Problem A—there is an inherent danger of a user walking away after logging on to the host platform, thus allowing an impostor to use the platform.

Problem B—a fake host platform may be able to steal sensitive information from the user.

Problem C—there are some auxiliary tokens whose owner's identities are not traceable to the owner of the logon token. In other words, an impostor, who does not own the logon token, may be able to use his own auxiliary tokens to impersonate the logon token's owner.

In addressing one or more of the above problems, the present inventors propose a new arrangement to reduce security risk and to establish a more trusted relationship between a host platform and a plurality of security tokens. Typically, the arrangement implements a security control policy that is more refined than the policy in the prior art model, including periodic or repeated authentication. Preferred embodiments of the invention implement mutual authentication and privilege restriction. Of particular importance are the criteria of ease of use and low expense of implementation compared with prior art solutions.

In a first aspect, the invention provides computing apparatus comprising: memory means storing the instructions of a secure process and an authentication process; processing means arranged to control the operation of the computing apparatus including by executing the secure process and the authentication process; user interface means arranged to receive user input and return to the user information generated by the processing means in response to the user input; and interface means for receiving a removable primary token and communicating with the token, the token comprising a body supporting: a token interface for communicating with the interface means; a token processor; and token memory storing token data including information for identifying the token and auxiliary token information identifying one or more authorised auxiliary tokens, wherein the processing means is arranged to receive the identity information and the auxiliary token information from the primary token, authenticate the token using the authentication process and, if the token is successfully authenticated, permit a user to interact with the secure process via the user interface means, and wherein the processing means is arranged to repeatedly authenticate the primary token and cause the computing platform to suspend interaction between the secure process and the user if authentication is not possible as a result of the removal of the primary token unless the primary token is replaced by an authorised auxiliary token.

In a second aspect, the invention provides a method of controlling computing apparatus to authenticate a user, comprising the steps of:

the computing apparatus receiving a primary token of the user, the primary token containing information suitable for authenticating the primary token and information relating to one or more authorised auxiliary tokens;

if the token is authentic, permitting the user to interact with one or more secure applications that may be executed by the computing platform;

at intervals, re-authenticating the primary token; and if it is not possible to re-authenticate the primary token, suspending the interaction between the computing apparatus and the user unless the primary token has been replaced with an authorised auxiliary token.

In a third aspect, the invention provides a smart card programmed for operation as a primary token in accordance with the method set out above. In a fourth aspect, the invention provides a computing apparatus configured for operation in accordance with the method set out above.

BRIEF DESCRIPTION OF THE DRAWINGS

Preferred embodiments of the present invention will now be described, by way of example only, with reference to the accompanying drawings, of which.

BEST MODE FOR CARRYING OUT THE INVENTION, & INDUSTRIAL APPLICABILITY

Figure 1:
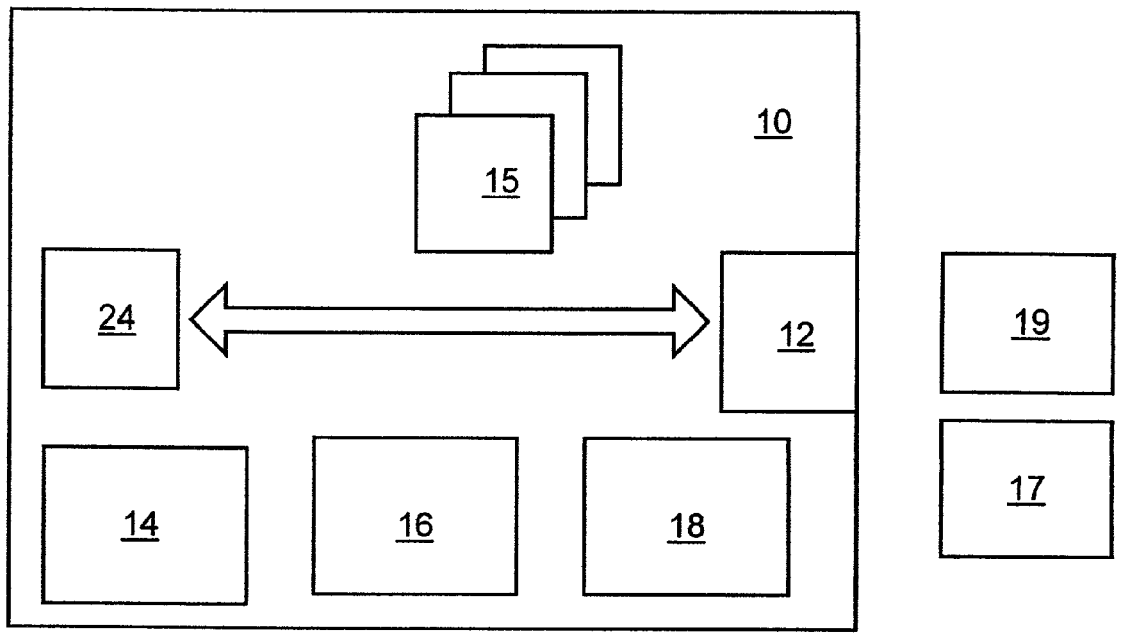
FIG. 1 is a diagram that illustrates a system capable of implementing embodiments of the present invention.

While the ideas of the invention are general, for ease of discussion, we will focus on preferred embodiments, wherein smart cards are the security tokens, which interact with a computing platform, or simply "platform". For the purpose of this specification, a computing platform is used to refer to at least one data processor and at least one data storage means, usually but not essentially with associated communications facilities e.g. a plurality of drivers, associated applications and data files, and which may be capable of interacting with external entities e.g. a user or another computer platform, for example by means of connection to the internet, connection to an external network, or by having an input port capable of receiving data stored on a data storage medium, e.g. a CD-ROM, floppy disk, ribbon tape or the like. In the arrangements described, a user has one logon smart card and a number of auxiliary smart cards, and needs to interact with the platform, which has only a single smart card reader. It is assumed in the present embodiment that there is no way for more than one smart card to be read by the smart card reader at the same time.

In order to address Problem A, as set out in the "Disclosure of the Invention", the present embodiments implement a coherent security control policy using a logon smart card operating with the platform. Specifically, to limit the potential for an impostor getting access to the platform without the legitimate user's knowledge, the logon smart card needs to be present throughout the session, rather than just to initiate the session. By analogy, the logon smart card is used more like a car key than a door key.

In effect, a user is held responsible for their actions. Since the smart card has to be present during the execution of a command, this effectively and unambiguously holds the owner of the smart card responsible for the action. As will be described below, in preferred embodiments the authentication is done automatically by the platform and does not generally require actions from the user. This amounts to a saving of time for the user and is, thus, a very attractive feature.

A major strength of the proposed scheme lies in its intuitive appeal. People are familiar with the importance of protecting their keys and accept full responsibility for respective misuse of the keys. The present scheme, which greatly enhances security, is simple to implement. As an added security feature, it is preferable that the logon smart card is also password protected, requiring a user to enter a password when the card is first inserted into the smart card reader. Password techniques are well-known and will not be described herein, so as not to obscure the invention.

Generally, to check the presence of the logon smart card, the platform needs repeatedly to authenticate the logon card. The actual frequency of the authentication can be configured by either a system administrator or the user. In practice, one would set the frequency high enough that the user, or an unauthorised user, would be unable to subvert the platform and carry out an unauthorised transaction between authentications. For example, authentication may occur every few seconds.

A further security feature that can be implemented in the security policy is a time-limit for each authenticated session using an auxiliary smart card. The user interface may also be locked unless a new round of authentication is performed within the pre-set time-limit. Further, preferably, time-stamping, or the use of nonces, is used to prevent "replay attacks" during authentication.

To address the fake host platform problem, Problem B above, the preferred embodiments use the concept of a trusted device built into the platform, which allows a user to verify the integrity of the platform. The concept of such a trusted device is the subject of the applicant's co-pending International Patent Application No. ## entitled "Trusted Computing Platform" filed on 15 Feb. 2000, the entire contents of which are hereby incorporated herein by reference.

To address Problem C, as set out in the "Disclosure of the Invention", where an auxiliary smart card may not be traceable to the owner of the logon smart card, the present invention introduces the concept of a user profile that binds a user to a number of auxiliary smart cards. This makes the implementation of a coherent, comprehensive and flexible security control policy extremely simple, inexpensive and transparent to the user.

Generally, in the preferred embodiments, it is always assumed that logging on is done by a logon smart card, and at some point of the session, the user (or the application running under the session) needs to use one or more auxiliary smart cards, so that removal of the logon card becomes necessary. To maintain the security policy of repeated authentication, there needs to be a security chain for the platform between trusting the logon smart card and trusting other auxiliary smart cards. This chain is built by letting the logon smart card 'introduce' the auxiliary cards to the platform, for example by using 'user profiles'.

For the sake of simplicity of description, only two types of auxiliary smart cards are considered in any detail herein:

"Cash cards", which are smart cards having cash values (or credits) that are transferable; and "Crypto cards", which are smart cards whose privileges (such as encryption or signature supported by a private key) are not transferable.

A "trusted platform" used in preferred embodiments of the invention will now be described. This is achieved by the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found in "Tamper Resistance—a Cautionary Note", by Ross Anderson and Markus Kuhn, published in the Second USENIX Workshop on Electronic Commerce Proceedings, Oakland, Calif., November 1996, pp 1–11, ISBN 1-880446-83-9. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms (not all trusted platforms employ smart cards), but is employed in various preferred embodiments described below and of relevance to the present invention. Alongside the smart card reader 12, there is illustrated a smart card 19 and one (possibly of several) auxiliary smart cards 17 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
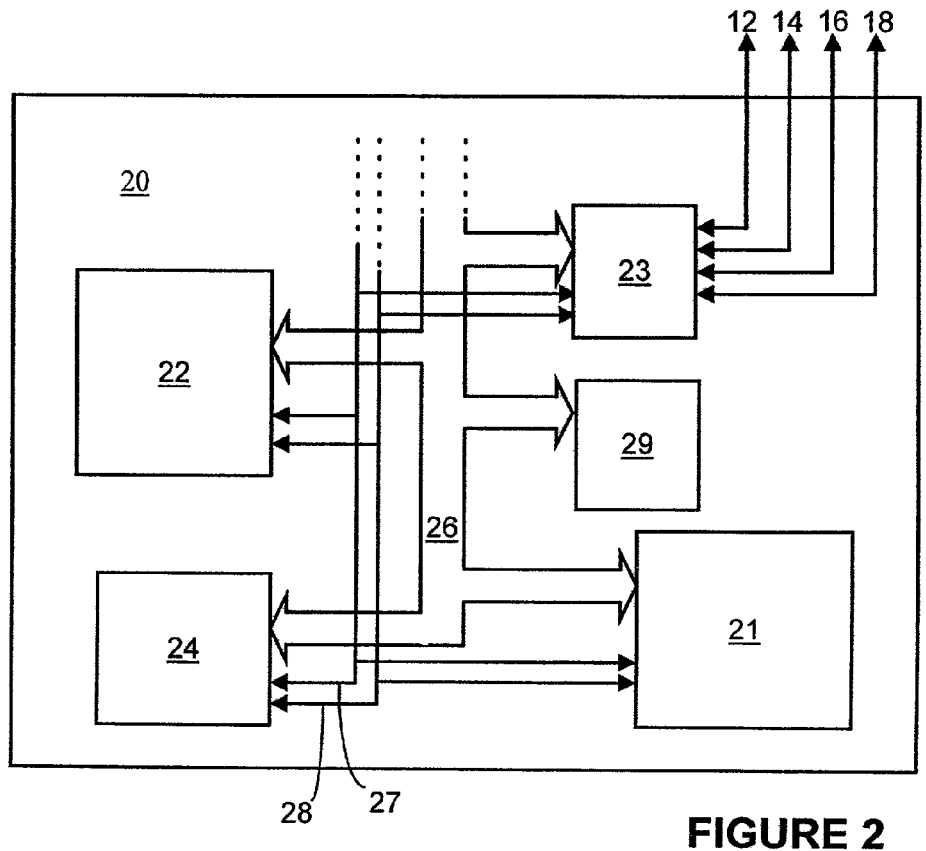
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
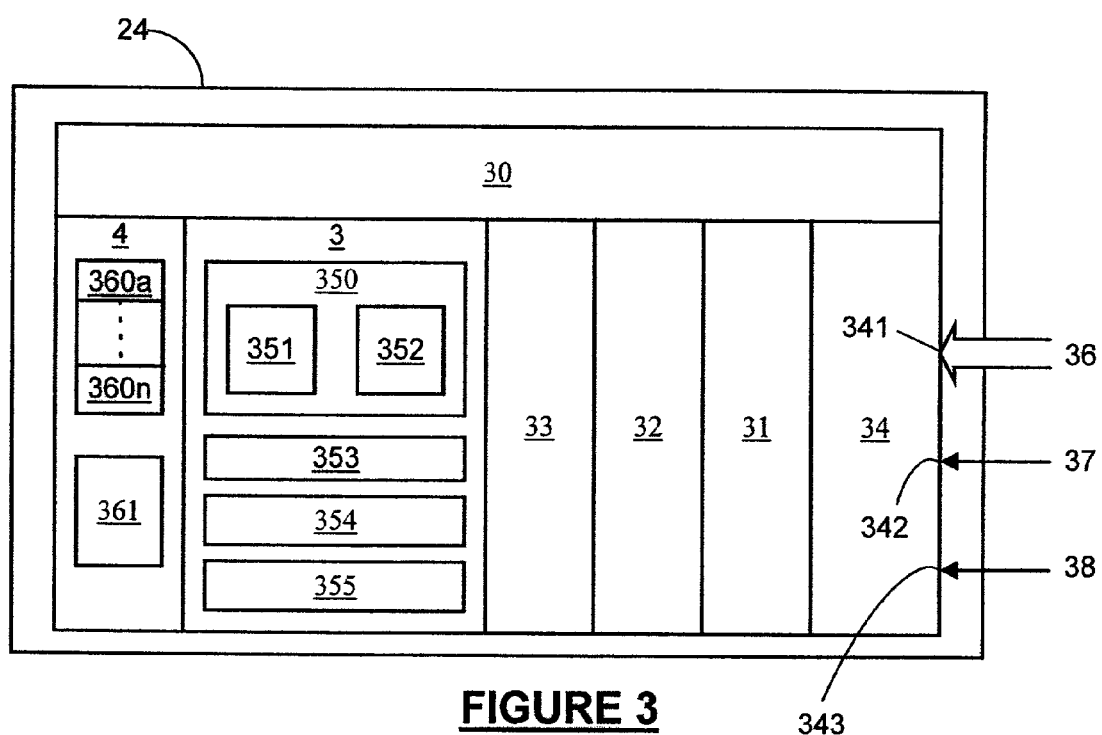
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a–360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
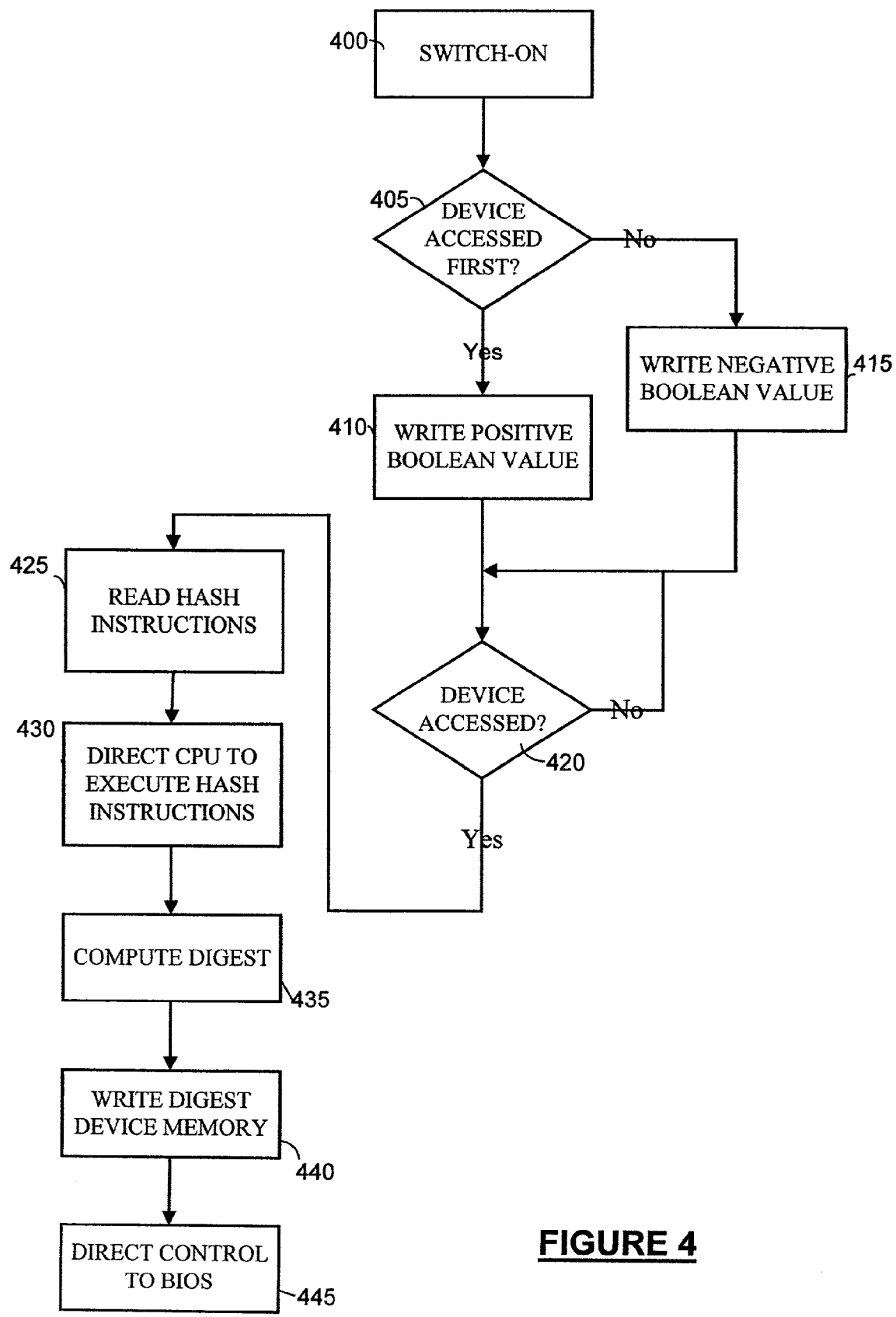
FIG. 4 is a flow diagram which illustrates the steps involved in acquiring an integrity metric of the computing apparatus.

A preferred process for acquiring an integrity metric will now be described with reference to FIG. 4.

In step 400, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 405, if the trusted device 24 is the first memory accessed, in step 410, the measurement function 31 writes to volatile memory 3 a Boolean value which indicates that the trusted device 24 was the first memory accessed. Otherwise, in step 415, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 420, when (or if) accessed as a memory by the main processor 21, the main processor 21 reads the stored native hash instructions 354 from the measurement function 31 in step 425. The hash instructions 354 are passed for processing by the main processor 21 over the data bus 26. In step 430, main processor 21 executes the hash instructions 354 and uses them, in step 435, to compute a digest of the BIOS memory 29, by reading the contents of the BIOS memory 29 and processing those contents according to the hash program. In step 440, the main processor 21 writes the computed digest 361 to the appropriate non-volatile memory location 4 in the trusted device 24. The measurement function 31, in step 445, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
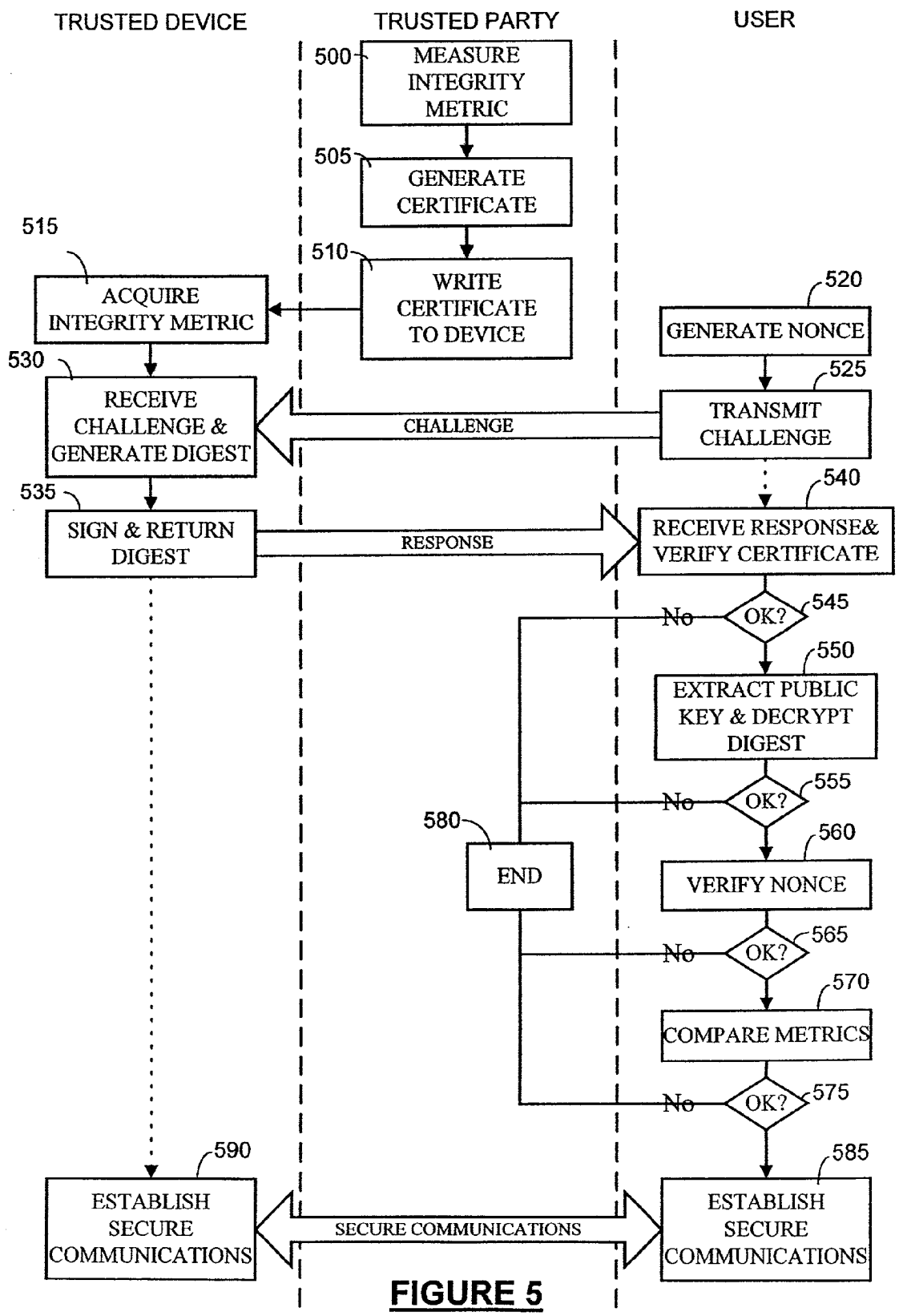
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification.

At the first instance, a TP, which vouches for trusted platforms, will inspect the type of the platform to decide whether to vouch for it or not. This will be a matter of policy. If all is well, in step 500, the TP measures the value of integrity metric of the platform. Then, the TP generates a certificate, in step 505, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 510, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 515, the trusted device 24 acquires and stores the integrity metric 361 of the platform.

When a user wishes to communicate with the platform, in step 520, he creates a nonce, such as a random number, and, in step 525, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 530, the trusted device 24 receives the challenge and creates an appropriate response. This may be a digest of the measured integrity metric and the nonce, and optionally its ID label. Then, in step 535, the trusted device 24 signs the digest, using its private key, and returns the signed digest, accompanied by the certificate 350, to the user.

In step 540, the user receives the challenge response and verifies the certificate using the well known public key of the TP. The user then, in step 550, extracts the trusted device's 24 public key from the certificate and uses it to decrypt the signed digest from the challenge response. Then, in step 560, the user verifies the nonce inside the challenge response. Next, in step 570, the user compares the computed integrity metric, which it extracts from the challenge response, with the proper platform integrity metric, which it extracts from the certificate. If any of the foregoing verification steps fails, in steps 545, 555, 565 or 575, the whole process ends in step 580 with no further communications taking place.

Assuming all is well, in steps 585 and 590, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
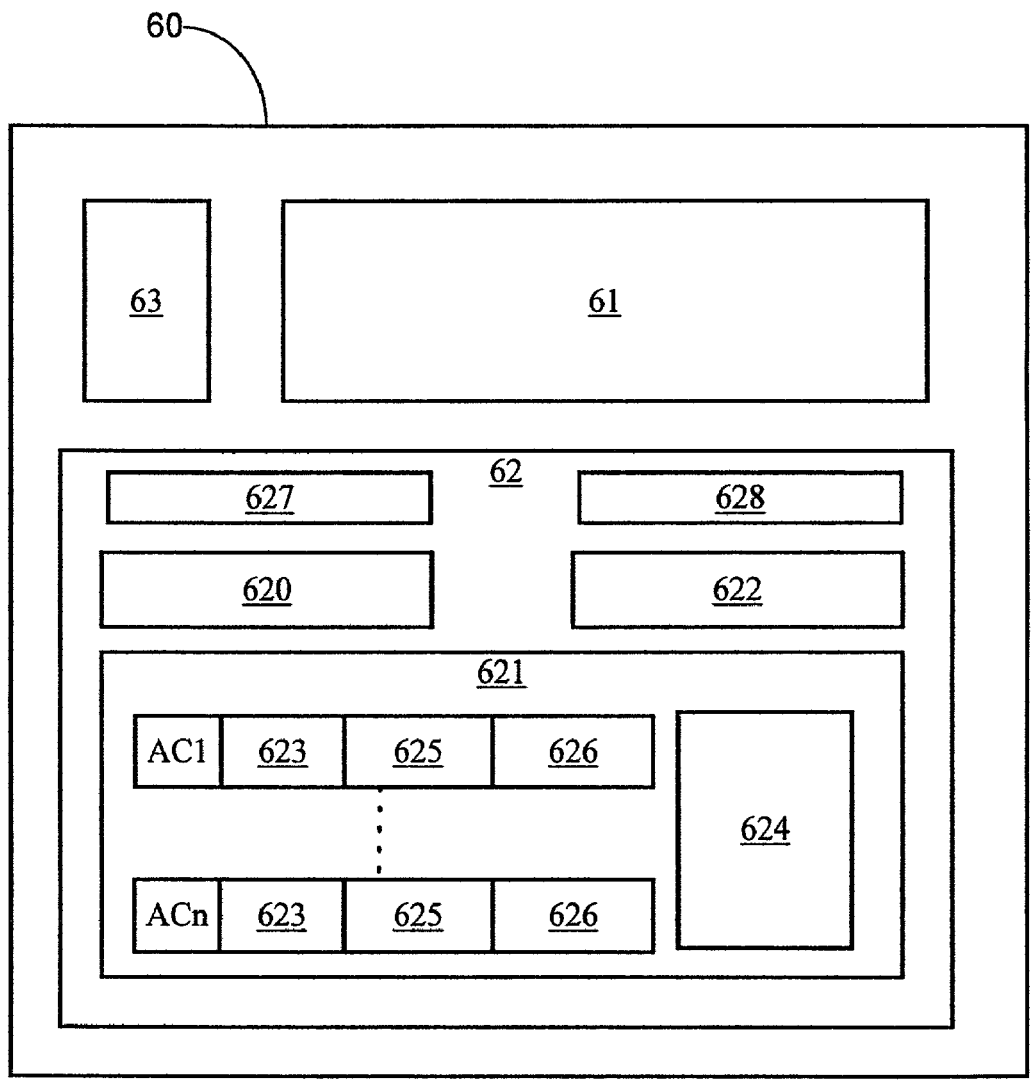
FIG. 6 is a diagram that illustrates the operational parts of a logon smart card for use in accordance with embodiments of the present invention.

A processing part 60 of a logon smart card 19 is illustrated in FIG. 6. As shown, the logon smart card 19 processing part 60 has the standard features of a processor 61, memory 62 and interface contacts 63. The processor 61 is programmed for simple challenge/response operations involving authentication of the logon smart card 19 and verification of the platform 10, as will be described below. The memory 62 contains its private key 620, its public key 628, a user profile 621, the public key 622 of the TP and an identity 627. The user profile 621 lists the allowable auxiliary smart cards 17 AC1–ACn usable by the user, and the individual security policy 624 for the user. For each auxiliary smart card 17, the user profile includes respective identification information 623, the trust structure 625 between the smart cards (if one exists) and, optionally, the type or make 626 of the smart card.

In the user profile 621, each auxiliary smart card 17 entry AC1–ACn includes associated identification information 623, which varies in dependence upon the type of card. For example, identification information for a cash card typically includes a simple serial number, whereas, for a crypto card, the identification information typically comprises the public key (or certificate) of the crypto card (the private key being stored secretly on the crypto card itself).

The 'security policy' 624 dictates the permissions that the user has on the platform 10 while using an auxiliary smart card 17. For example, the user interface may be locked or unlocked while an auxiliary smart card 17 is in use, depending on the function of the auxiliary smart card 17. Additionally, or alternatively, certain files or executable programs on the platform 10 may be made accessible or not, depending on how trusted a particular auxiliary smart card 17 is. Further, the security policy 624 may specify a particular mode of operation for the auxiliary smart card 17, such as 'credit receipt' or 'temporary delegation', as will be described below.

A 'trust structure' 625 defines whether an auxiliary smart card 17 can itself 'introduce' further auxiliary smart cards 17 into the system without first re-using the logon smart card 19. In the embodiments described in detail herein, the only defined trust structure is between the logon smart card 19 and the auxiliary smart cards 17 that can be introduced to the platform 10 by the logon smart card 19. Introduction may be 'single session' or 'multi-session', as will be described below. However, there is no reason why certain auxiliary smart cards 17 could not in practice introduce further auxiliary smart cards 17. This would require an auxiliary smart card 17 to have an equivalent of a user profile listing the or each auxiliary smart card that it is able to introduce.

Figure 7:
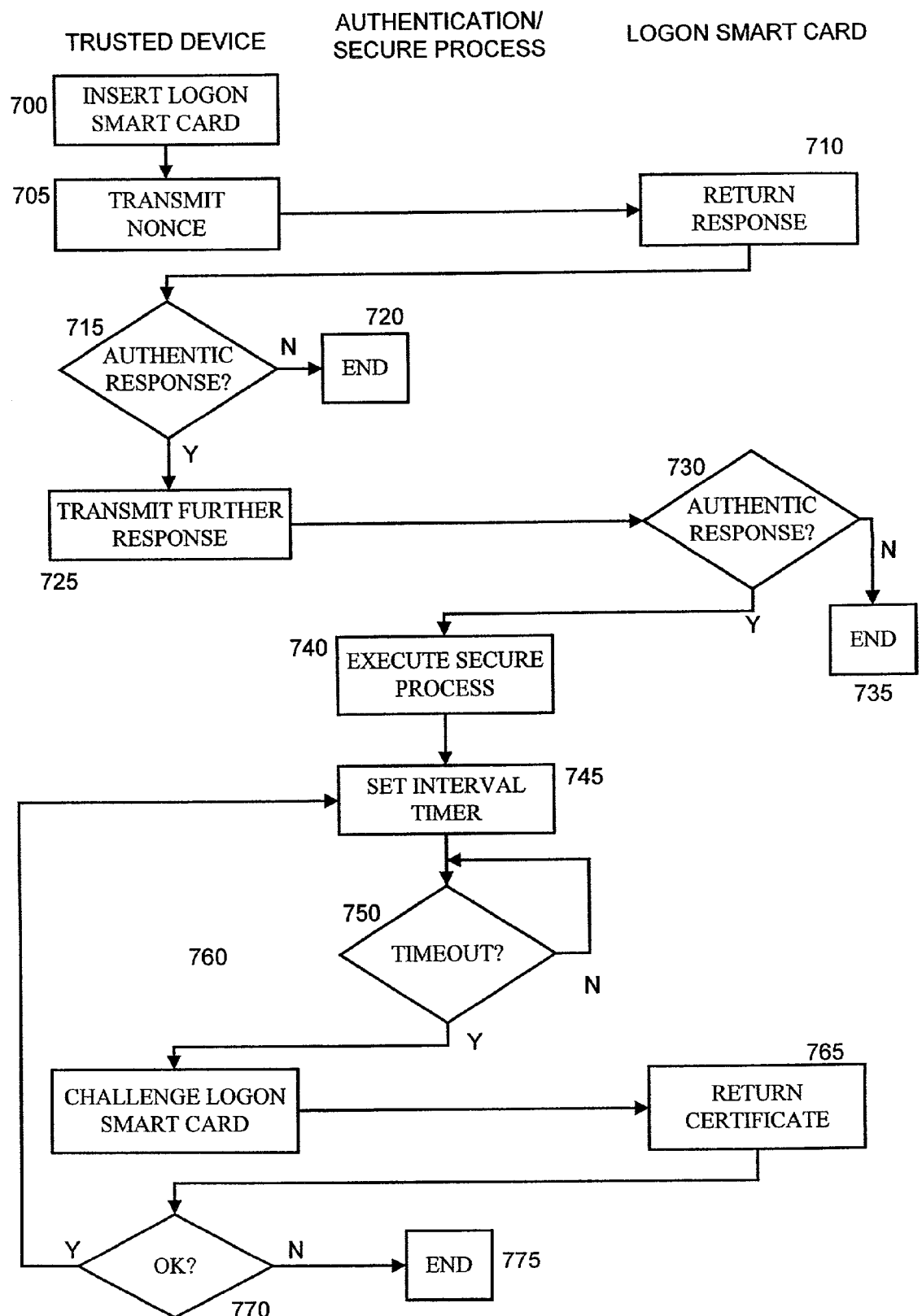
FIG. 7 is a flow diagram which illustrates the process of mutually authenticating a logon smart card and a host platform.

A preferred process for authentication between a logon smart card 19 and a platform 10 will now be described with reference to the flow diagram in FIG. 7. As will be described, the process conveniently implements a challenge/response routine. There exist many available challenge/response mechanisms. The implementation of an authentication protocol used in the present embodiment is mutual (or 3-step) authentication, as described in ISO/IEC 9798-3. Of course, there is no reason why other authentication procedures cannot be used, for example 2-step or 4-step, as also described in ISO/IEC 9798-3.

Initially, the user inserts their logon smart card 19 into the smart card reader 12 of the platform 10 in step 700. Beforehand, the platform 10 will typically be operating under the control of its standard operating system and executing the authentication process, which waits for a user to insert their logon smart card 19. Apart from the smart card reader 12 being active in this way, the platform 10 is typically rendered inaccessible to users by 'locking' the user interface (i.e. the screen, keyboard and mouse).

When the logon smart card 19 is inserted into the smart card reader 12, the trusted device 24 is triggered to attempt mutual authentication in step by generating and transmitting a nonce A to the logon smart card 19 in step 705. A nonce, such as a random number, is used to protect the originator from deception caused by replay of old but genuine responses (called a 'replay attack') by untrustworthy third parties.

In response, in step 710, the logon smart card 19 generates and returns a response comprising the concatenation of: the plain text of the nonce A, a new nonce B generated by the logon smart card 19, the ID 353 of the trusted device 24 and some redundancy; the signature of the plain text, generated by signing the plain text with the private key of the logon smart card 19; and a certificate containing the ID and the public key of the logon smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, the ID 627 of the logon smart card 19 and the acquired integrity metric; the signature of the plain text, generated by signing the plain text using the private key of the trusted device 24; and the certificate comprising the public key of the trusted device 24 and the authentic integrity metric, both signed by the private key of the TP.

The logon smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the logon smart card 19 and the logon smart card 19 has verified the integrity of the trusted platform 10 and, in step 740, the authentication process executes the secure process for the user. Then, the authentication process sets an interval timer in step 745. Thereafter, using appropriate operating system interrupt routines, the authentication process services the interval timer periodically to detect when the timer meets or exceeds a predetermined timeout period in step 750.

Clearly, the authentication process and the interval timer run in parallel with the secure process.

When the timeout period is met or exceeded, the authentication process triggers the trusted device 24 to re-authenticate the logon smart card 19, by transmitting a challenge for the logon smart to identify itself in step 760. The logon smart card 19 returns a certificate including its ID 627 and its public key 628 in step 765. In step 770, if there is no response (for example, as a result of the logon smart card 19 having been removed) or the certificate is no longer valid for some reason (for example, the logon smart card has been replaced with a different smart card), the session is terminated by the trusted device 24 in step 775. Otherwise, in step 770, the process from step 745 repeats by resetting the interval timer.

A preferred, general process for introducing an auxiliary smart card 17 into a platform 10 will now be described with reference to the flow diagram in FIG. 8.

When the secure process running on the platform 10 reaches a point where the logon smart card 19 needs to be replaced by an auxiliary smart card 17, for example at the time a cash card is needed to credit the platform 10 with funds for a remote transaction, in step 805 the secure process retrieves the user profile from the trusted device 24 and stores it in its volatile memory 35. The trusted device 24 then extracts the details of the auxiliary smart cards 17 from the user profile and returns the details to the secure process in step 810. In step 815, the secure process displays an option list of auxiliary smart cards 17 and asks the user to select one. The secure process receives the users selection in step 820 and displays a message asking the user to replace the logon smart card 19 with the (or one of the) selected auxiliary smart card(s) 17 in step 825. As soon as the user ejects the logon smart card 19, the trusted device locks the user interface in step 830 and, in step 835, the secure process initialises the authentication process interval timer with a new timeout period, which determines the allowable duration of the auxiliary smart card session.

[In parallel with the operation of the secure process, which has been described with reference to FIG. 7), if the timeout period expires before the logon smart card 19 has been reinstated, the authentication process suspends the session (i.e. the secure process) and provides the user with an appropriate message. The authentication process has the authority to suspend the secure process, since it executed the secure process in the first instance. Clearly, the new timeout period needs to be sufficient for the required purposes, and may be configurable by a system administrator for this reason.]

When the user inserts the selected auxiliary smart card 17, the trusted device 24 is triggered to send the auxiliary smart card 17 a challenge to identify itself in step 840. The auxiliary smart card 17 responds by returning its identity information to the trusted device 24 in step 845. The trusted device 24 then verifies the identity information by comparing it with the stored user profile information in step 850.

If the trusted device 24 is unable to verify the auxiliary smart card 17 for any reason, in step 855 the session ends and the secure process displays an appropriate message for the user. Otherwise, in steps 860 and 865, the secure process interacts with the auxiliary smart card 17 as required.

When the interaction is complete, in step 870, the secure process displays a prompt to the user to replace the auxiliary smart card 17 with the logon smart card 19. When the user ejects the auxiliary smart card 17 form the smart card reader 12 and inserts the logon smart card 19, the trusted device 24 is triggered to authenticate the logon smart card 19, by executing from step 760 in FIG. 7, as described above, resulting in the session ending in step 775 or continuing in step 745.

Additionally, or alternatively, in some embodiments it may be required that the user profile is encrypted and signed to protect privacy and integrity. If so, a secure data transfer protocol may be needed between the trusted device 24 and the logon smart card 19. There exist many available mechanisms for transferring secure credentials between two entities. A possible implementation, which may be used in the present embodiment, is secure key transport mechanisms from ISO/IEC DIS 11770-3.

Clearly, the operation of the process that has just been described for introducing an auxiliary smart card 17 may vary in dependence upon the type of the auxiliary smart card 17; for example, whether it is a cash card or a crypto card. Variations in process for different types of auxiliary smart card 17 will now be described.

Credit Receipt Mode

A credit receipt mode allows a user to remove the logon smart card 19 for a very brief period of time (say 2 minutes, which is configurable by a system administrator or a user) from the smart card reader 12 to allow credits (or cash values) from a cash card to be transferred to the trusted device 24 of the platform 10 without undue security risk.

Figure 8:
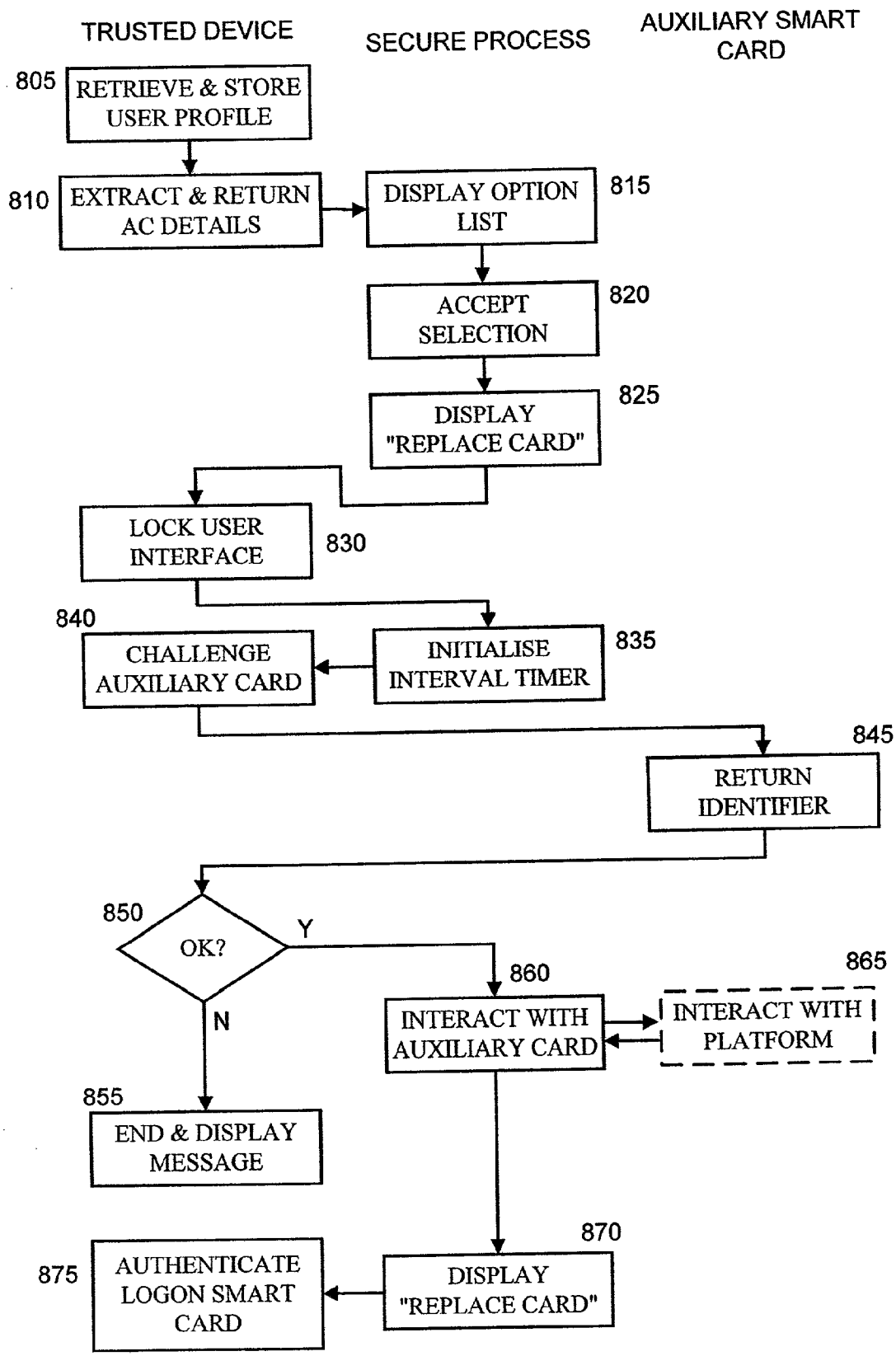
FIG. 8 is a flow diagram which illustrates one general example of introducing an auxiliary smart card to a host platform using by a logon smart card in accordance with embodiments of the invention.
Figure 9:
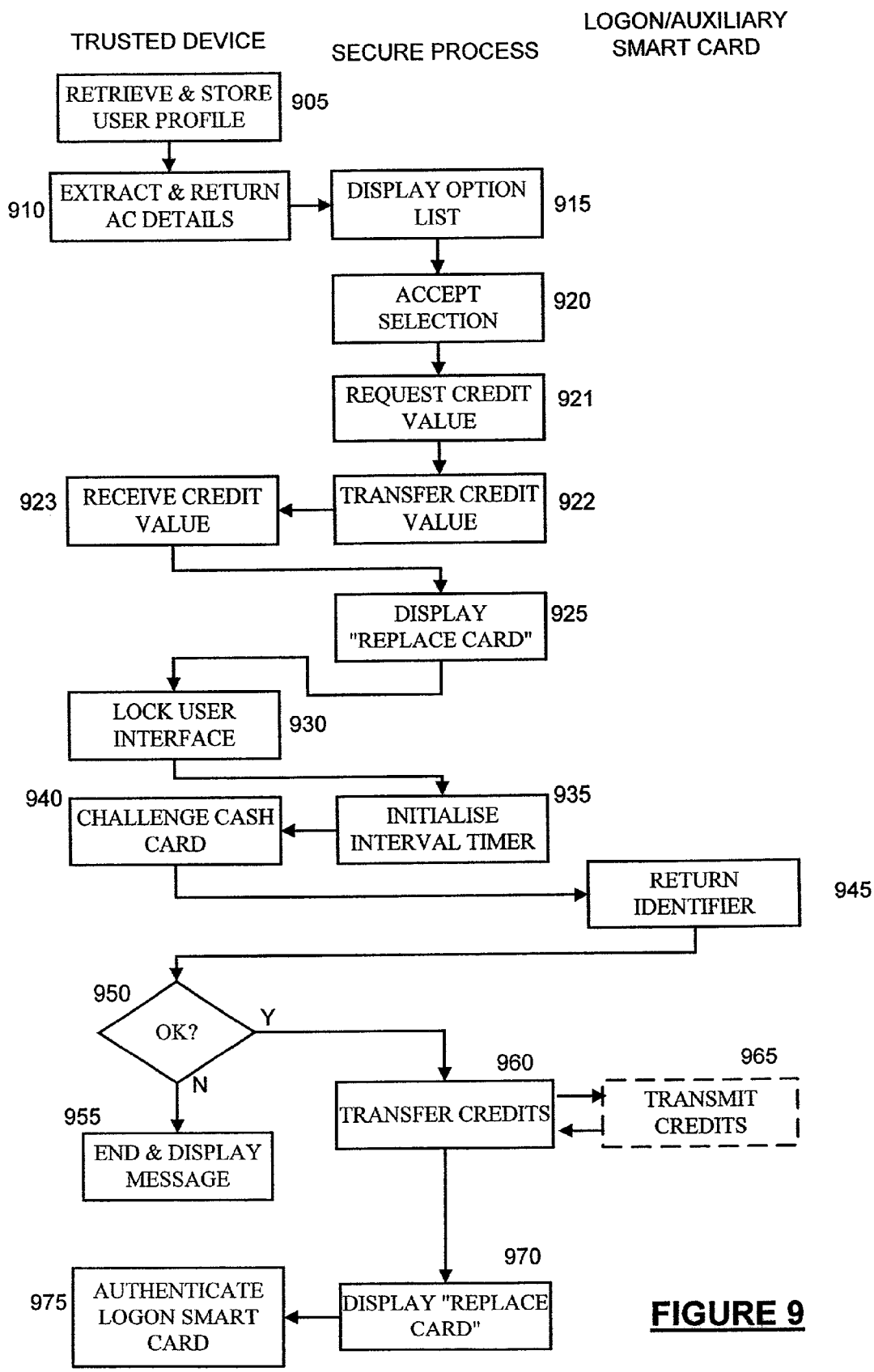
FIG. 9 is a flow diagram which illustrates one example of the operation between an introduced cash card and the host platform.

FIG. 9 illustrates the process for enacting credit receipt mode. The steps that correspond to those illustrated in FIG. 8 will not be specifically described again.

It is assumed that a user profile that lists auxiliary smart cards 17 including cash cards is stored in the logon smart card 19. As before, when a user invokes an application that requires cash values, the secure process displays a request for the user to choose a cash card from those listed in the user profile.

The first difference between the credit receipt mode process and the process in FIG. 8 is that in step 921 the secure process displays a further request for the user to enter the amount of the credit transfer. The secure process receives the entered amount in step 922 and forwards a respective value to the trusted device 24 in step 923. The trusted device 24 transfers the credits from the cash card to the trusted device 24 in steps 960 and 965, after the cash card has been inserted and authenticated.

As an alternative or additional feature, depending on the security policy, unauthorised cash cards may also be used; for example, there may be an option "Others" in the list of authorised cash cards. Clearly, the risks associated with receiving credits from any auxiliary smart card 17 are relatively low.

Typically, only a relatively short time is required to enact the whole process of transferring the credits. The length of the timeout period is determined by the security policy in the user profile. If the timeout is exceeded, the transfer process is aborted and the user interface is temporarily locked. On the other hand, if the user reinserts the logon smart card 19 within the specified time-limit, a new round of authentication is performed between the smart card and the platform 10. Upon successful verification, the user interface will be unlocked and the original session, i.e. before the credit transfer mode, resumes, but with the cash value now stored in the trusted device 24. The cash value may be used for, for example, electronic commerce.

Since the user interface is essentially locked during the credit transfer mode, and is re-activated only after the re-insertion of the logon smart card 19, the host platform 10 does not suffer any serious security risk in the credit receipt mode. Further, since the user has to authenticate which cash card to use, using the logon smart card 19, abuse of cash cards by illegal users is also minimised.

Temporary Delegation Modes

Figure 10:
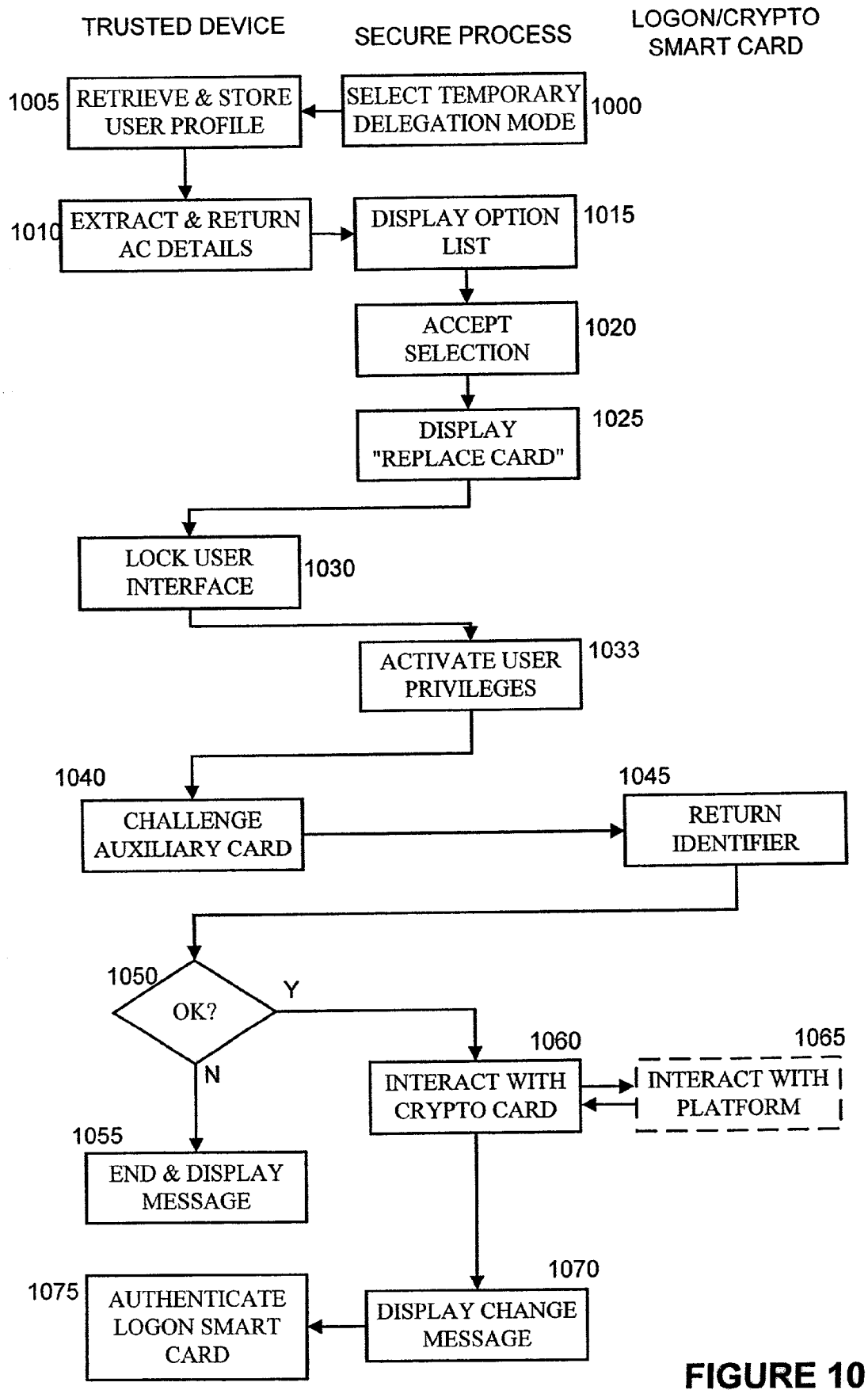
FIG. 10 is a flow diagram which illustrates one example of a single session temporary delegation mode.

It will be appreciated that for a crypto card to function (say for encryption, decryption, signature and verification), it potentially needs to be inserted in the place of a logon card for a substantial amount of time, unlike for cash cards. To address the need for potentially greater periods of time to use a crypto card, the present embodiment includes what is referred to as a temporary delegation mode, which allows a user to use crypto cards in place of the logon card for an undefined time, subject to possible respective security policy limitations. Temporary delegation modes will now be described with reference to the flow diagram in FIG. 10. The steps that correspond to those illustrated in FIG. 8 will not be specifically described again.

To invoke a temporary delegation mode, a user (or the secure process) selects a temporary delegation mode in step 1000 while the logon smart card 19 is being used. In response, the host platform 10 takes the steps to receive and authenticate the auxiliary smart card 17, which in this example is a crypto card.

When provided with a list of allowable crypto cards, the user specifies the authorised crypto card. Depending on the security policy, unregistered crypto cards may or may not be used. Again, if the user profile is encrypted, a secure data transfer protocol (again, as discussed in ISO/IEC DIS 11770-3) may be employed.

After the logon smart card 19 is removed, the user interface is locked and a the secure process displays a message requesting a new smart card.

Upon insertion and authentication of the specified crypto card, the secure process activates user privileges in step 1033 consistent with the security policy of the crypto card. For example, the user may need to use the user interface for entry of certain information related to the crypto card operation, but should not be able to execute any other process or perform any other operation.

When the crypto card is removed from the smart card reader 12, the user interface is locked again, until the logon smart card 19 is inserted and authenticated.

The example of the temporary delegation mode described above allows a single auxiliary smart card 17 to be used in a 'single session' in place of the logon smart card 19 for an undefined period of time.

Figure 11:
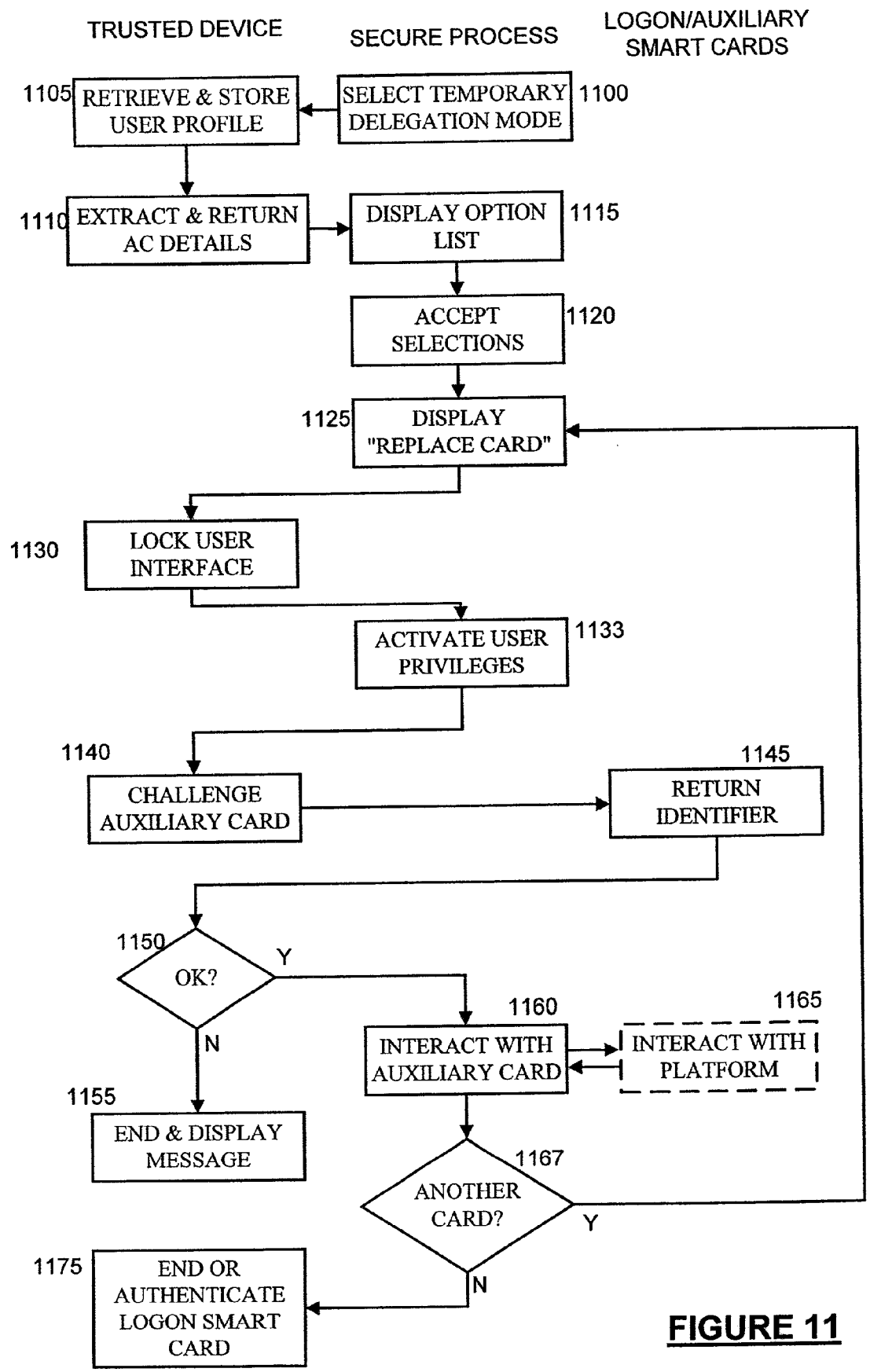
FIG. 11 is a flow diagram which illustrates one example of a multiple session temporary delegation mode.

An alternative, or additional, temporary delegation mode permits multiple auxiliary smart cards 17 to be used in turn, in place of the logon smart card 19, without the need to re-insert the logon smart card 19. An example of such a 'multi-session' temporary delegation mode will now be described with reference to FIG. 11. As before, the steps that correspond to those illustrated in FIG. 8 will not be specifically described again.

In a multi-session, multiple auxiliary smart cards 17 can be freely used in place of the logon smart card 19, thus allowing maximal convenience of use.

To invoke a multi-session temporary delegation mode, a user (or the secure process) selects a multi-session temporary delegation mode in step 1100 while the logon smart card 19 is being used.

A significant difference between a multi-session temporary delegation mode and the single session temporary delegation mode is that, when provided with the list of available authorised auxiliary smart cards 17 in step 1115, the user can select multiple authorised auxiliary smart cards 17 in step 1120. The selected auxiliary smart cards 17 may be of different kinds depending on the user's requirements.

The host platform 10 takes the steps to receive and authenticate any one of the selected auxiliary smart cards 17.

As soon as the logon smart card 19 is ejected the user interface is locked, the secure process activates user privileges consistent with the operation of that auxiliary smart card 17 in step 1133. When the auxiliary smart card 17 is eventually ejected, the process loops to step 1125, a message is generated to replace the card and the user interface is locked again in step 1130. When the next auxiliary smart card 17 is inserted, the secure process activates user privileges consistent with the operation of that auxiliary smart card 17 in step 1133 again.

This procedure may be repeated for any of the selected auxiliary smart cards 17 until the session ends or the logon smart card is re-inserted in step 1175. In other words, the user can use any combination of the selected auxiliary smart cards 17 without the need of the insertion of the logon smart card 19 during the whole multi-session. Clearly, such a permissive multi-session is very convenient for the user, although the benefits need to be weighed against the risks of such freedom.

Note that a security control policy described in the user profile may give constraints on the number, types and makes of smart cards allowed in a multi-session as well as any time-limits. Typically, different auxiliary smart cards 17 give the user different sets of privileges. For instance, some sensitive files may be locked whenever the auxiliary smart card 17 currently being used is regarded to be not trustworthy enough. Indeed, any truly sensitive application may require the insertion of the logon smart card 19 again for authentication.

Since it is not easy to estimate how long a temporary delegation mode will last, in theory, it might be acceptable to have no timeout period as such, as in the examples above. However, there are risks associated with such a policy, for example a user may leave the platform 10 during a temporary delegation mode session. Therefore, it is preferable to have an overall timeout period, fixed for the temporary delegation mode session, which overrides both the normal re-authentication timeout period of the authentication process and the individual timeout periods associated each auxiliary smart card 17. Additionally, it might also be possible to have individual timeout periods for certain auxiliary smart cards 17. As usual, the specification of the timeout period(s) will be determined by the security policies for the auxiliary smart cards 17. In practice, the timeout period for a temporary delegation mode is implemented by the secure process overriding the authentication process. Exemplary fixed session timeout periods for temporary delegation modes are 30 minutes, 1 hour or 2 hours. The period(s) can be set or modified by the user or a system administrator, and may depend on the trustworthiness of the platform 10.

Re-insertion of the original logon card will typically be needed for extending the temporary delegation mode session, and, generally, the secure process issues a warning message to the user prior to expiration. This is analogous to request for insertion of coins in a phone booth during phone calls. Upon expiration, the user interface will be locked and can be unlocked only by the logon card. If a user attempts to use a time-consuming application in a temporary delegation mode, the secure process may request the insertion of a logon smart card 19 beforehand to avoid locking the user interface in the middle of an application.

There are a variety of possible, different temporary delegation modes that generally specify the class of auxiliary smart cards 17 and applications allowed during the temporary delegation mode. For instance, in some modes, perhaps only a single type of auxiliary smart card 17 (possibly with traceable ID) is allowed. In other modes, only a small class of auxiliary smart cards 17 is allowed. In yet other modes, a large class of auxiliary smart cards 17 is allowed.

The exact set of privileges that can be delegated is a function of the system security policy, a choice by the user (in set-up and/or during the session itself), and the type and make of the auxiliary card being used. Some privileges may be revoked during a temporary delegation mode. For instance, some files (currently on screen or otherwise) may become locked once the temporary delegation mode is employed. High security applications might request the re-insertion of the original logon card. In an extreme case, all privileges except for the specific application may be temporarily suspended during the temporary delegation mode.

As an alternative, or in addition, to the embodiments described above, the logon smart card 19 may be programmed to categorise different platform 10s. For example, platform 10s may be categorised as "fairly trustworthy", "very trustworthy", or "extremely trustworthy", depending on the type of the platform 10. In this case, the platform 10 type will be revealed by the identity information received by the logon smart card 19 from the platform 10. The logon smart card 19 is programmed to compare the identity information with pre-determined, stored information, where a particular match indicates the category of the platform 10. Conveniently, the stored category information forms part of the user profile.

The security policy that the logon smart card 19 adopts with a particular platform 10 then depends on the category of the platform 10. In one example, the logon smart card 19 may transmit different user profile information to the platform 10 depending on the platform 10's category. For example, with a "fairly trustworthy" platform 10, the smart card might only pass information relating to crypto cards to the platform 10, to restrict the user to only being able to send and receive encrypted emails, or surf the Internet. Additionally, for "fairly trustworthy" platform 10s, the user profile information may limit to 'single-session' temporary delegation modes. In contrast, a "very trustworthy" platform 10 may receive user profile information that permits multi-session temporary delegation modes and even cash card transactions. Finally, an "extremely trusted" platform 10 would receive user profile information to permit all possible actions including multi-session and cash card transactions but also other administrative functions.

An example of an administrative function, requiring an "extremely trusted" platform 10, is the ability to create or modify the user profile of a logon smart card 19. When a logon smart card 19 verifies that a platform 10 is an "extremely trusted" platform 10, it passes user profile information to the platform 10 that includes an option to allow the user to select, from the secure process, a profile modification option. When the user selects the registration process, a special smart card registration process 'wizard' is displayed. This wizard allows the user to add a new auxiliary smart card 17, delete an existing auxiliary smart card 17, and view the detailed information of each auxiliary smart card 17's ID, such as its public key or certificate. In the user profile, each registered smart card has a distinguished number and name given during its registration. 'Wizards' are well known in the art of computer applications, and will not be described in any further detail herein.

In alternative embodiments, the user profile information may be stored in the trusted device 24 or in a remotely located trusted platform 10. Such arrangements would typically require different mechanisms for controlling access by the secure process or platform 10 to the user profile information, but the use of the information once accessed would remain the same.

The present invention is not limited in application to smart cards (or other security tokens), which interact passively with a platform. The invention is applicable also to smart cards which can initiate a command to a platform (or trusted device on a platform), communicate with the trusted device for exchange of messages and information, send requests for information, and receive results from the trusted device in response to those requests. Implementation of initiation of user commands from a smart card is known in "Smartcards—from Security Tokens to Intelligent Adjuncts", by Boris Balacheff, Bruno Van Wilder and David Chan, published in CARDIS 1998 Proceedings.

Similarly, the interpretation of integrity measurements provided by the trusted device may not be achieved by the user, as represented by a smart card or otherwise. An appropriate solution is for a user smart card to have access (typically through the platform) to a trusted third party server which provides this functionality. This can be an advantageous solution because of the limited processing power and memory available on most smart cards. In this arrangement, the integrity metrics data is sent not to the smart card but to a remote server trusted by the smart card. The remote server verifies that the integrity metrics data provided by the trusted device is correct by comparing it with a set of expected integrity metrics. The expected integrity metrics may be supplied by the trusted device itself from pre-stored data within it, or where the platform is of a common type, the trusted server may store sets of expected integrity metrics for that type of computer platform. In either case, the trusted server performs the heavy computational data processing required for verification of the integrity metrics with the expected integrity metrics, and digitally signs the result of the verification. This is sent back to the smart card, which then may either accept or reject the digital signature, and hence the verification result.

While the invention has been described with reference to several preferred embodiments, it will be appreciated that various modifications can be made to the parts and methods that comprise the invention without departing from the spirit and scope thereof.

The invention claimed is:

1. Computing apparatus comprising:
   memory means storing the instructions of a secure process and an authentication process;
   processing means arranged to control the operation of the computing apparatus including by executing the secure process and the authentication process;
   user interface means arranged to receive user input and return to the user information generated by the processing means in response to the user input; and
   interface means for receiving a removable primary token and communicating with the token, the token comprising a body supporting:
   a token interface for communicating with the interface means;
   a token processor; and
   token memory storing token data including identity information for identifying the token and auxiliary token information identifying one or more authorised auxiliary tokens,
   wherein the processing means is arranged to receive the identity information and the auxiliary token information from the primary token, authenticate the token using the authentication process and, if the token is successfully authenticated, permit a user to interact with the secure process via the user interface means,
   and wherein the processing means is arranged to repeatedly authenticate the primary token and cause the computing platform to suspend interaction between the secure process and the user if authentication is not possible as a result of the removal of the primary token unless the primary token is replaced by an authorised auxiliary token identified by said auxiliary token information.

2. Computing apparatus according to claim 1, arranged to generate information representing the integrity of the computing apparatus and transmit the integrity information to the primary token, wherein the token processor is programmed to verify the integrity of the computing apparatus including by using the integrity information.

3. Computing apparatus according to claim 1, wherein the authorised token is a cash token and the secure process is arranged to credit or debit the token.

4. Computing apparatus according to claim 1, wherein the authorised token is a crypto token programmed to encrypt, decrypt or sign data, and the secure process is arranged to transmit data to the crypto token to be encrypted, decrypted or signed and receive encrypted, decrypted or signed data from the crypto token.

5. Computing apparatus according to claim 1, arranged, only if the different token is an authorised auxiliary token, to allow the user to interact with the secure process.

6. Computing apparatus according to claim 1, further comprising timer means programmed with a timeout period, wherein, in the event the different token is an authorised auxiliary token, the computing apparatus resets the timer and continues operation until the timeout period expires, after which time the computing apparatus suspends any interactions between the secure process and either or both the user and the authorised auxiliary token.

7. Computing apparatus according to claim 6, arranged to recommence said interactions in the event the authorised auxiliary token is replaced by the primary token and the computing apparatus is able to authenticate the primary token.

8. Computing apparatus according to claim 1, arranged to permit interaction between the secure process and only one authorised auxiliary token after removal of the primary token.

9. Computing apparatus according to claim 1, arranged to permit interaction between the secure process and more than one authorised auxiliary token after removal of the primary token.

10. Computing apparatus according to claim 1, wherein the processing means comprises a main processing unit and a secure processing unit and the memory means comprises main memory and secure memory.

11. Computing apparatus according to claim 10, comprising a trusted device incorporating the secure processing unit and the secure memory, wherein the trusted device is programmed to authenticate the primary token repeatedly.

12. Computing apparatus according to claim 11, wherein the trusted device is arranged to acquire an integrity metric of the computing apparatus, and the primary token is arranged to use the integrity metric on at least one occasion to verify the integrity of the computing apparatus.

13. Computing apparatus according to claim 1, wherein the primary token comprises a smart card, and the interface means is configured to receive a smart card.

14. Computing apparatus according to claim 1, wherein the auxiliary token information is stored in a user profile.

15. A method of controlling computing apparatus to authenticate a user, comprising the steps:
    the computing apparatus receiving a primary token of the user, the primary token containing information suitable for authenticating the primary token and identification information relating to one or more authorised auxiliary tokens;
    if the token is authentic, permitting the user to interact with one or more secure applications that may be executed by the computing platform;
    at intervals, re-authenticating the primary token; and
    if it is not possible to re-authenticate the primary token, suspending the interaction between the computing apparatus and the user unless the primary token has been replaced with an authorised auxiliary token identified by said auxiliary token identification information.

16. A method according to claim 15, further comprising the steps:
    the computing apparatus providing integrity metric information to the primary token;
    the primary token using the integrity metric information to verify the integrity of the computing apparatus; and
    if the primary token is unable to verify the integrity of the computing apparatus, suspending interaction between the computing apparatus and the user.

17. A method according to claim 15, wherein the computing apparatus interaction with the authorised auxiliary token for a limited period of time.

18. A method according to claim 15, wherein the computing apparatus only permits interaction with one authorised auxiliary token after removal of the primary token.

19. A method according to claim 15, wherein the computing apparatus permits interaction with plural authorised auxiliary tokens after removal of the primary token.

20. Computing apparatus comprising:
    one or more memories adapted to store the instructions of a secure process and an authentication process;
    one or more processors arranged to control the operation of the computing apparatus including by executing the secure process and the authentication process;

a user interface arranged to receive user input and return to the user information generated by the one or more processors in response to the user input; and a token reader interface for receiving and communicating with a removable token, the token having a token memory storing token data including identity information for identifying the token and auxiliary token information identifying one or more authorized auxiliary tokens, wherein the one or more processors are arranged to receive the identity information and the auxiliary token information from a primary token received in the token reader interface, authenticate the primary token using the authentication process and, if the primary token is successfully authenticated, permit a user to interact with the secure process via the user interface, and wherein the one or more processors are arranged to repeatedly authenticate the primary token and cause the computing platform to suspend interaction between the secure process and the user if authentication is not possible as a result of the removal of the primary token unless the primary token is replaced by an authorized auxiliary token identified by said auxiliary token information.

21. Computing apparatus according to claim 20, wherein the primary token comprises a token processor and the one or more processors are arranged to generate information representing the integrity of the computing apparatus and transmit the integrity information to the primary token, wherein the token processor is programmed to verify the integrity of the computing apparatus including by using the integrity information.

22. Computing apparatus according to claim 20, further comprising a timer programmed with a timeout period, wherein, in the event the different token is an authorized auxiliary token, the computing apparatus resets the timer and continues operation until the timeout period expires, after which time the computing apparatus suspends any interactions between the secure process and either or both the user and the authorized auxiliary token.

23. Computing apparatus according to claim 22, arranged to recommence said interactions in the event the authorized auxiliary token is replaced by the primary token and the computing apparatus is able to authenticate the primary token.

24. Computing apparatus according to claim 20, wherein the one or more processors comprise a main processor and a secure processor and the one or more memories comprise a main memory and a secure memory.

25. Computing apparatus according to claim 24, wherein said computer apparatus comprises a trusted device incorporating the secure processor and the secure memory, wherein the trusted device is programmed to authenticate the primary token repeatedly.

26. Computing apparatus according to claim 25, wherein the trusted device is arranged to acquire an integrity metric of the computing apparatus, and the primary token is arranged to use the integrity metric on at least one occasion to verify the integrity of the computing apparatus.

27. Computing apparatus according to claim 20, wherein the primary token comprises a smart card, and the token reader interface is configured to receive a smart card.

* * * * *